(12) United States Patent
Mahadevan et al.

(10) Patent No.: US 9,053,390 B2
(45) Date of Patent: Jun. 9, 2015

(54) AUTOMATED INSPECTION SCENARIO GENERATION

(75) Inventors: Mohan Mahadevan, Santa Clara, CA (US); Govind Thattaisundaram, Milpitas, CA (US); Ajay Gupta, San Jose, CA (US); Chien-Huei (Adam) Chen, San Jose, CA (US); Jason Kirkwood, Mountain View, CA (US); Ashok Kulkarni, San Jose, CA (US); Songnian Rong, San Jose, CA (US); Ernesto Escorcia, Sunnyvale, CA (US); Eugene Shifrin, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 301 days.

(21) Appl. No.: 13/585,115

(22) Filed: Aug. 14, 2012

(65) Prior Publication Data

US 2014/0050389 A1    Feb. 20, 2014

(51) Int. Cl.
  *G06K 9/00* (2006.01)
  *G06K 9/62* (2006.01)
  *G06T 7/00* (2006.01)
(52) U.S. Cl.
  CPC ............ *G06K 9/6254* (2013.01); *G06T 7/0004* (2013.01); *G06T 2207/30148* (2013.01)
(58) Field of Classification Search
  None
  See application file for complete search history.

(56) References Cited

U.S. PATENT DOCUMENTS

| | | | |
|---|---|---|---|
| 5,619,429 A * | 4/1997 | Aloni et al. .................. 700/279 |
| 6,578,188 B1 * | 6/2003 | Pang et al. ..................... 716/52 |
| 6,665,065 B1 * | 12/2003 | Phan et al. ................. 356/237.1 |
| 7,570,797 B1 * | 8/2009 | Wang et al. .................... 382/145 |
| 7,573,284 B2 * | 8/2009 | Balchiunas .............. 324/759.03 |
| 8,135,204 B1 | 3/2012 | Chen et al. |
| 8,249,828 B2 * | 8/2012 | Teshima et al. ............... 702/183 |
| 2003/0132405 A1 | 7/2003 | Some |
| 2004/0156540 A1 | 8/2004 | Gao et al. |
| 2004/0228515 A1 * | 11/2004 | Okabe et al. .................. 382/145 |
| 2005/0033538 A1 * | 2/2005 | Okabe et al. .................... 702/82 |

(Continued)

FOREIGN PATENT DOCUMENTS

JP    2009-070834 A    4/2009

OTHER PUBLICATIONS

International Search Report and Written Opinion mailed on Nov. 27, 2013, for PCT Application No. PCT/US2013/054763 filed on Aug. 13, 2013, by KLA-Tencor Corporation, 9 pages.

*Primary Examiner* — Barry Drennan
*Assistant Examiner* — Alexander J Lesnick
(74) *Attorney, Agent, or Firm* — Spano Law Group; Joseph S. Spano

(57) ABSTRACT

Methods and systems for determining inspection scenarios without input from a user are presented. Inspection scenarios include at least one acquisition mode, defect detection parameter values, and classification parameter values. In one example, a number of defect events are determined by a hot inspection of a wafer surface. The defect events are classified and attributes associated with each defect event are identified. The defect events are labeled with this information. Based on the identified attributes and classification, inspection scenarios are determined. The inspection scenarios are solutions in a mathematical space formed by the identified attributes. In some examples, a plurality of inspection scenarios are determined and a desired inspection scenario is selected from the plurality based on the number of defects of interest and the number of nuisance events captured by the selected inspection scenario.

17 Claims, 4 Drawing Sheets

(56) References Cited

U.S. PATENT DOCUMENTS

| | | | |
|---|---|---|---|
| 2005/0158887 A1* | 7/2005 | Simmons | 438/14 |
| 2006/0287751 A1 | 12/2006 | Dishner et al. | |
| 2007/0172111 A1* | 7/2007 | Ikeda | 382/149 |
| 2013/0163851 A1* | 6/2013 | Dalla-Torre et al. | 382/149 |
| 2013/0204569 A1* | 8/2013 | Goren et al. | 702/117 |
| 2013/0336575 A1* | 12/2013 | Dalla-Torre et al. | 382/149 |

* cited by examiner

| | MODE 1 INSPECTION SCENARIOS | | MODE 1 ∩ MODE 2 INSPECTION SCENARIOS | | MODE 2 INSPECTION SCENARIOS | |
|---|---|---|---|---|---|---|
| INDEX | D | N | D | N | D | N |
| 1 | 5 | 0 | 3 | 0 | 8 | 0 |
| 2 | 12 | 1 | 6 | 1 | 19 | 1 |
| 3 | 13 | 2 | 7 | 3 | 26 | 2 |
| ⋮ | ⋮ | ⋮ | ⋮ | ⋮ | ⋮ | ⋮ |

… # AUTOMATED INSPECTION SCENARIO GENERATION

TECHNICAL FIELD

The described embodiments relate to systems for wafer inspection, and more particularly to automated recipe generation in wafer inspection.

BACKGROUND INFORMATION

Semiconductor devices such as logic and memory devices are typically fabricated by a sequence of processing steps applied to a substrate or wafer. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Inspection processes are used at various steps during a semiconductor manufacturing process to detect defects on wafers to promote higher yield. As design rules and process windows continue to shrink in size, inspection systems are required to capture a wider range of physical defects on wafer surfaces while maintaining high throughput.

Many different types of inspection systems have adjustable acquisition mode parameters (e.g., data, signal, and/or image acquisition parameters), adjustable defect detection parameters, and adjustable defect classification parameters. Different parameters are used to detect different defects of interest and avoid sources of noise that give rise to unwanted nuisance events. An inspection system with adjustable acquisition mode, defect detection, and classification parameters offers significant advantages to a semiconductor device manufacturer by making it possible for a single tool to successfully discriminate a wide range of defects. However, successful inspection requires correct selection of these parameters. Parameter selection is complicated and unpredictable because wafer characteristics, defect characteristics, process conditions, and noise on wafers may vary dramatically.

For inspection tasks that require identifying defect of interest from nuisance events, a successful inspection recipe for a semiconductor layer should maximize the number of detects of interest (DOI) detected while minimizing the number of nuisance events detected. By extension, for inspection tasks that require binning of defects, a successful inspection recipe for a semiconductor layer should maximize the number of correctly binned defects while minimizing the number of nuisance events detected. Formulating an inspection recipe generally involves tuning the acquisition mode parameters, defect detection parameters, and defect classification parameters separately until the desired result is achieved. This process involves a significant amount of manual effort as combinations of acquisition mode parameters, defect detection parameters, and defect classification parameters are manually considered. In some cases, defect detection parameters may be considered in an automated manner with either the acquisition mode parameters or the classification parameters, but this still requires manual consideration of combinations of parameter sets in two parameter spaces to arrive at a desired inspection recipe.

Accordingly, it would be advantageous to develop methods and/or systems for generating inspection scenarios combining acquisition mode, defect detection, and classification parameters from results of a scan of a wafer without user intervention.

SUMMARY

Methods and systems for determining inspection scenarios without input from a user are presented. Inspection scenarios include at least one acquisition mode, defect detection parameter values, and classification parameter values. An amount of labeled defect data including a number of defect events and a classification and attributes associated with the defect events are received. A number of inspection scenarios are determined based on the labeled defect data without user input. The inspection scenarios are solutions in a mathematical space formed by the identified attributes. In some examples, a plurality of inspection scenarios are determined and a desired inspection scenario is selected from the plurality based on the number of defects of interest and the number of nuisance events captured by the selected inspection scenario. In some of these examples, the selection is made automatically.

In one example, a number of defect events are determined by a hot inspection of a wafer surface. The defect events are classified and attributes associated with each defect event are identified. The defect events are labeled with this information. Based on the identified attributes and classification, inspection scenarios are determined.

In other examples, a number of defect events are derived from Optics Selector (OS) data determined by inspection of a portion of a wafer surface. The defect events are classified and attributes associated with each defect event are identified. The defect events are labeled with this information. Based on the identified attributes and classification, inspection scenarios are determined.

In some examples, labeled defect data is associated with wafer scans performed with different acquisition modes. In addition, an inspection scenario determined from the labeled defect data includes a combination of at least two of the different acquisition modes.

The foregoing is a summary and thus contains, by necessity, simplifications, generalizations, and omissions of detail. Consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
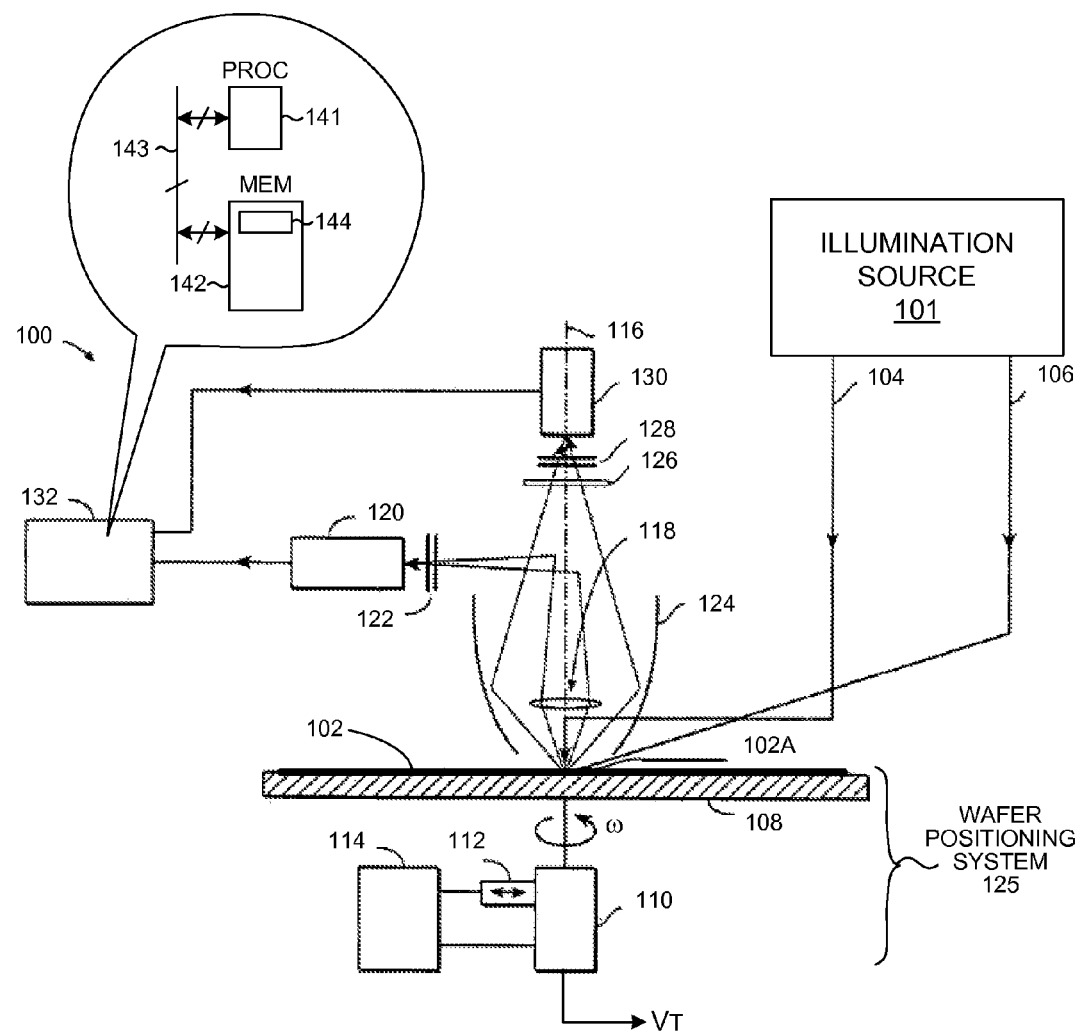
FIG. 1 is a simplified diagram illustrative of a wafer inspection system 100 including inspection scenario optimization functionality.

FIG. 1 is a simplified schematic view of a typical wafer inspection system 100. For simplification, some optical components of the system have been omitted, such as components directing the illumination beams to the wafer. A wafer 102 is illuminated by any of a normal incidence beam 104 and an oblique incidence beam 106 generated by one or more illumination sources 101. The area or spot 102a illuminated by either one or both beams 104, 106 on wafer 102 scatters radiation from the beam(s). The radiation scattered by area 102a along directions close to a line 116 perpendicular to the surface of the wafer and passing through the area 102a is collected and focused by lens collector 118 and directed to a photo-multiplier tube (PMT) 120. Since lens 118 collects the scattered radiation along directions close to the normal direction, such collection channel is referred to herein as the narrow channel and PMT 120 as the dark field narrow PMT. When desired, one or more polarizers 122 may be placed in the path of the collected radiation in the narrow channel.

Radiation scattered by spot 102a of wafer 102, illuminated by either one or both beams 104, 106, along directions away from the normal direction 116 is collected by an ellipsoidal collector 124 and focused through an aperture 126 and optional polarizers 128 to dark field PMT 130. Since the ellipsoidal collector 124 collects scattered radiation along directions at wider angles from the normal direction 116 than lens 118, such collection channel is referred to as the wide channel. The outputs of detectors 120, 130 are supplied to a computer 132 for processing the signals and determining the presence of anomalies and their characteristics.

Figure 2:
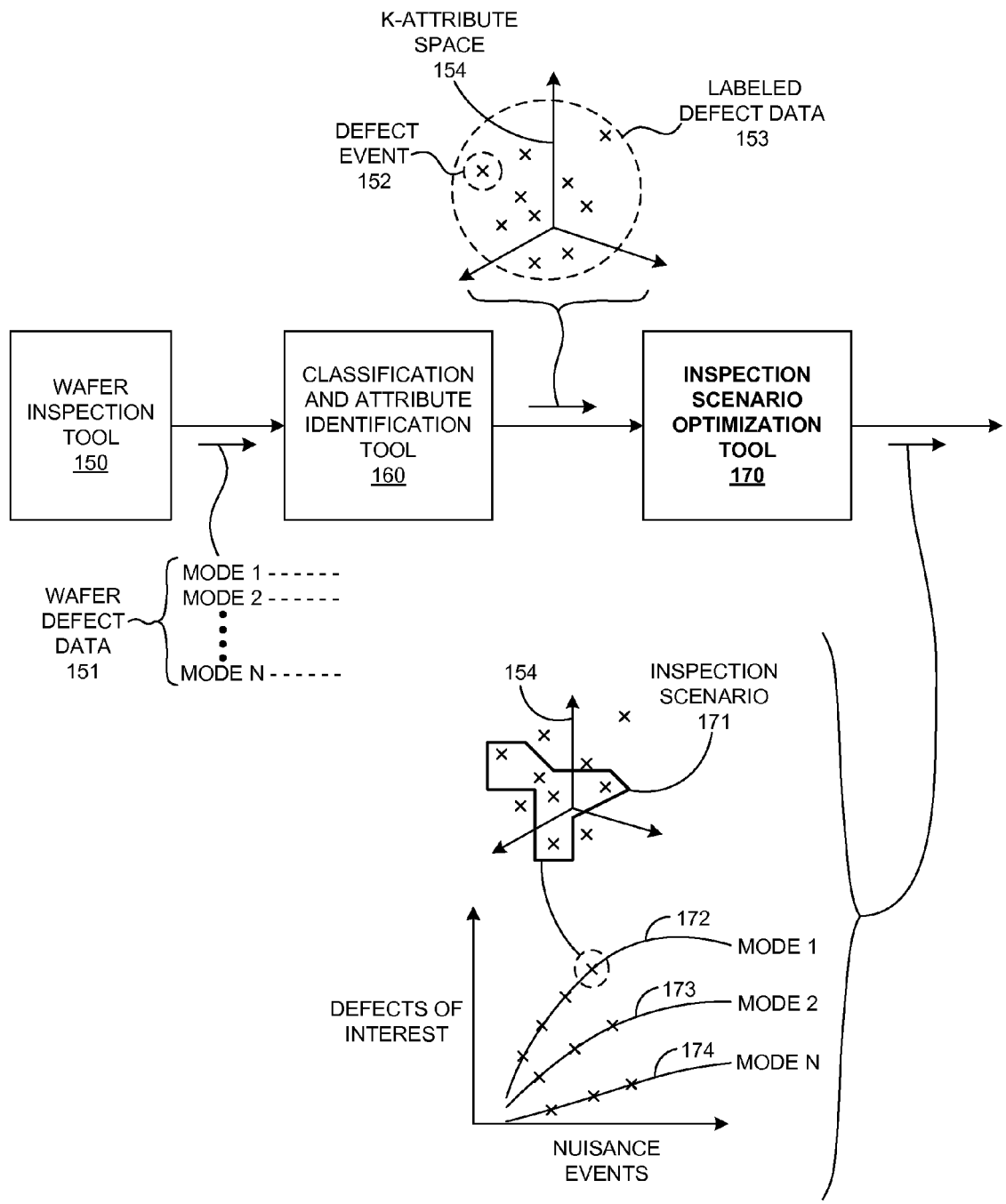
FIG. 2 is a simplified diagram illustrative of one embodiment of a system implementing automated inspection scenario optimization as described herein.

In one embodiment, wafer positioning system 125 includes a wafer chuck 108, motion controller 114, a rotation stage 110 and a translation stage 112. Wafer 102 is supported on wafer chuck 108. As illustrated in FIG. 2, wafer 102 is located with its geometric center approximately aligned the axis of rotation of rotation stage 110. In this manner, rotation stage 110 spins wafer 102 about its geometric center at a specified angular velocity, $\omega$, within an acceptable tolerance. In addition, translation stage 112 translates the wafer 102 in a direction approximately perpendicular to the axis of rotation of rotation stage 110 at a specified velocity, $V_T$. Motion controller 114 coordinates the spinning of wafer 102 by rotation stage 110 and the translation of wafer 102 by translation stage 112 to achieve the desired scanning motion of wafer 102 within wafer inspection system 100.

Various aspects of surface inspection system 100 are described in U.S. Pat. Nos. 6,271,916 and 6,201,601, both of which are incorporated herein by reference. An exemplary surface inspection system is available from KLA-Tencor Corporation of San Jose, Calif., the assignee of the present application.

Referring to FIG. 1, wafer inspection system 100 includes a processor 141 and an amount of computer readable memory 142. As depicted in FIG. 1, by way of example, computer 132 includes processor 141 and memory 142, however, processor 141 and memory 142 may be included in other components of wafer inspection system 100. Processor 141 and memory 142 may communicate over bus 143. Memory 142 includes an amount of memory 144 that stores a program code that, when executed by processor 141, causes processor 141 to execute inspection scenario optimization tool functionality such that inspection scenarios combining acquisition mode, defect detection, and classification parameters are generated without user intervention from labeled defect data from a wafer scan.

In addition, wafer inspection system 100 may include peripheral devices useful to accept inputs from an operator (e.g., keyboard, mouse, touchscreen, etc.) and display outputs to the operator (e.g., display monitor). In one example, input commands from an operator may be used by processor 141 to generate plots of inspection scenarios (e.g., receiver operating curves). In another example, input commands from an operator may be used by processor 141 to select a desired inspection scenario from a plurality of inspection scenarios graphically presented to an operator on a display monitor.

In one aspect, inspection scenarios combining acquisition mode, defect detection, and classification parameters are generated from labeled defect data without user intervention. In some examples inspection scenarios associated with a single optical acquisition mode are generated. In some other examples, inspection scenarios including at least one combination of at least two optical acquisition modes are generated.

In general, a primary performance objective of a wafer inspection system is to capture as many defects of interest as possible while minimizing the number of nuisance events. For inspection tasks that require binning of defects, a primary performance objective of a wafer inspection system is to maximize the number of correctly binned defects while minimizing the number of nuisance events detected. A nuisance event occurs when a wafer inspection system reports a defect at a particular location on the wafer where no defect in fact exists (e.g., the defect is a noise artifact). In general, to avoid nuisance events while increasing sensitivity to defects of interest, a wafer inspection system should operate with an inspection recipe optimized for the wafer under inspection. A "recipe" can be generally defined as a set of instructions for carrying out a process such as inspection and metrology. An inspection scenario includes the set of instructions for carrying out data acquisition, defect detection, and defect classification tasks.

The term "parameter" is used herein to refer to the adjustable variables that are used to define a "recipe" of an inspection and/or metrology tool. By way of example, the parameter(s) for wafer processing may include a parameter of a tool used to acquire results responsive to a physical stimulus (e.g., electrons, photons, etc.) from the wafer. Alternatively, or in addition, the parameter(s) for wafer processing may include a parameter of the tool used to process the results. In this manner, the parameter(s) may include results acquisition parameter(s) and/or results processing parameter(s).

As described herein, parameters include acquisition mode parameters. A non-exhaustive list of exemplary acquisition mode parameters of an optical inspection system includes illumination subsystem parameters, light detection subsystem parameters, and motion subsystem parameters. The one or more parameters of the illumination subsystem may include, for example, angle(s) of illumination, wavelength(s) of illumination, polarization(s) of illumination, spot size, aperture(s) included in the illumination subsystem, other optical component(s) included in the illumination subsystem, and combinations thereof. The one or more parameters of the light detection subsystem may include, for example, angle(s) of collection, wavelength(s) of detection, polarization(s) of detection, pixel size, aperture(s) included in the detection subsystem, other optical component(s) included in the detection subsystem, and combinations thereof. The one or more parameters of the motion subsystem parameters may include, for example, scanning speed, rotational speed, focus position, and combinations thereof. Similar parameter(s) can be determined for non-photon based systems (e.g., electron beam systems).

In some embodiments, defect detection parameters include one or more parameters used for processing results generated by wafer scans. For example, the one or more parameters may include one or more parameters used for processing results generated by a light detection subsystem used to perform wafer scans. In one such example, the results generated by the light detection subsystem may include images or image data, and the one or more parameters may include one or more parameters used to filter, align, etc. the images or image data. In another example, the results may include signals, and the one or more parameters may include one or more parameters used for filtering, normalizing, calibrating, etc. the signals. The one or more parameters used for processing the results may be determined separately for different areas on the wafer. For example, results generated in one area of the wafer may be processed using one or more first parameters, and results generated in another area of the wafer may be processed using one or more second parameters, at least some of which may be different than the first parameter(s). The one or more parameters may also or alternatively include a defect detection sensitivity, which may be defined by one or more parameters (e.g., a threshold) of a defect detection algorithm and/or method. In addition, the one or more parameters may include different detection sensitivities for different areas of the wafer (e.g., higher sensitivity for critical or less noisy areas and lower sensitivity for non-critical or noisier areas).

A non-exhaustive list of exemplary classification parameters includes iDO™ settings that are adjustable (e.g., all settings that the user is allowed to adjust). iDO™ is an inline Defect Organizer™ binning solution that is commercially available from KLA-Tencor, Milpitas, Calif.. In general, classification parameters include parameters or sets of parameters used to characterize defect size, shape, location, design characteristics, intensity distribution, etc. In some embodiments, the number of classification parameters may exceed one hundred parameters. In some embodiments, classification parameters include defect attributes associated with defect events.

As described herein, one or more acquisition mode parameters, defect detection parameters, and defect classification parameters are determined automatically (i.e., without user input). However, other acquisition mode, defect detection, and defect classification parameters may also or alternatively be determined with input from a user. For example, a user may be provided feedback on the performance of one or more determined parameters as the user changes the recipe settings.

As illustrated in FIG. 2, a wafer inspection tool 150 generates wafer defect data 151. By way of example, wafer inspection tool 150 may be a dark field (DF) inspection tool, bright field (BF) inspection tool, electron beam (e-beam) inspection tool, a combination DF and BF inspection tool, LED inspection tool, edge inspection tool, backside inspection tool, macro-inspection tool, or multi-mode inspection tool (involving data from one or more platforms simultaneously), or any other metrology or inspection tool that benefits from automated inspection scenario generation. In one example, wafer inspection tool 150 repeatedly scans a portion of a wafer in several different acquisition modes (e.g., Mode 1, Mode 2, . . . Mode N) using one or more predetermined sets of defect detection parameters. In the case of bright field (BF) inspection systems commercially available from KLA-Tencor, San Jose, Calif., the detection algorithms may be auto-thresholding (AT), segmented auto-thresholding (SAT) or multiple die auto-thresholding (MDAT), and the defect detection parameters may be segment breaks and thresholds. The predetermined parameters are selected to result in a substantially "hot" inspection. A "hot" inspection increases the likelihood of detecting defects of interest but at the expense of substantially high nuisance rates. In this manner, wafer defect data 151 includes a rich set of defect events associated with a range of acquisition modes.

Wafer defect data 151 is received by a classification and attribute identification tool 160 for defect review (i.e., classification) and labeling of defect data. In one example, a user takes the wafer defect data 151 and the associated wafer to a scanning electron microscope (SEM) for defect review. A user reviews the defects using the SEM and manually classifies a portion of the defect events as real defects, nuisance defects, or defects of interest. In addition, defect attributes are attached to each classified defect event. As described herein, labeled defect events are characterized by attributes. The attribute of the defects may include an attribute of the defects determined using a defect detection algorithm. For example, MDAT is a defect detection algorithm used by some inspection tools that are commercially available from KLA-Tencor, San Jose, Calif. In this example the attributes may include magnitude, MDAT offset, MDAT gray level (reference gray level), and energy. In addition, a defect attribute may include an attribute of the defect that is responsive to a characteristic (e.g., intensity) of light from the defect detected during a scan or even a relative response between a group of pixels. The attribute of the defect can be as general as possible. It could include non-intensity type attributes such as defect location, defect size and any other computed or measured quantity. It could include design attributes (i.e., reference geometry and material specifications) derived from Graphic Database System (GDS) files or other sources. There is no limitation to the nature of the attribute as described herein. In this manner, classification and attribute tool 160 generates a set of labeled defect data 153 located in a K-dimensional attribute space 154 (i.e., each dimension associated with each attribute, respectively) with each labeled defect event (e.g., labeled defect event 152) classified. In this example, the set of labeled defect data 153 is labeled hot scan data because as explained hereinbefore the labeled defect data 153 is derived from wafer defect data 151 generated from a "hot" scan or plurality of "hot" scans. In other examples, labeled defect data 153 may be derived from optics selector data. Optics selector data includes wafer scan data collected in a region around a known defect. For example, optics selector data includes wafer scan data collected around a known defect while optimizing a wafer inspection process for that defect. In other examples, labeled defect data 153 may be derived from modification of actual wafer scan data. By way of example, the modification of actual wafer scan data may be based on perturbation modeling techniques. In one example, a number of perturbed data sets are generated and inspection scenarios determined based on these perturbed data sets. Inspection scenarios are selected that perform as desired for each of the perturbed data sets. This ensures that the selected inspection scenarios are robust to process variations that are represented by the perturbed data sets.

Labeled defect data 153 is communicated to inspection scenario optimization tool 170. Based on the labeled defect data 153, inspection scenario optimization tool 170 generates at least one inspection scenario including an acquisition mode selection, defect detection algorithm parameter values, and classification algorithm parameter values without user input. As illustrated in FIG. 2, inspection scenario optimization tool 170 determines inspection scenario 171 as one solution within K-attribute space 154, where K is the number of attributes associated with each labeled defect event. The defect events captured within inspection scenario 171 were previously classified and labeled. Thus, the number of defects of interest and the number of nuisance events captured by inspection scenario 171 may be determined and plotted.

In the example illustrated in FIG. 2, inspection scenario optimization tool 170 generates a number of inspection scenarios associated with acquisition mode 1, a number of inspection scenarios associated with acquisition mode 2, etc. The number of defects of interest and the number of nuisance events captured by each inspection scenario may be plotted. The locus of plotted inspection scenarios associated with each acquisition mode may be plotted as a receiver operating characteristic (ROC) curve. As illustrated by way of example, ROC curve 172 is associated with acquisition mode 1, ROC curve 173 is associated with acquisition mode 2, and ROC curve 174 is associated with acquisition mode N.

Inspection scenarios can be determined by any number of algorithms. For example, any of a support vector machine, K-nearest neighbor, decision tree, Gaussian mixture, neural network, simulated annealing, and genetic algorithm may be employed to determine an inspection scenario within K-attribute space 154. In some examples, a decision tree algorithm has been found to produce satisfactory results in a relatively simple implementation. In another example, K-nearest neighbor has been found to produce satisfactory results in a relatively simple implementation. In yet another example, a support vector machine has been found to produce satisfactory results in a relatively simple implementation.

In one example, an inspection scenario is selected based on a desired combination of the number of defects of interest and nuisance events associated with the inspection scenario. In one example, a user may select an inspection scenario by examining ROC curves 172-174 and selecting his/her preferred combination of DOI and nuisance events. In another example, inspection scenario optimization tool 170 may automatically select an inspection scenario.

In some examples an inspection scenario is determined based on labeled defect data 153 from a relatively large number of classified defect events on a wafer. As described herein, a "hot" scan results in a relatively large number of defect events, many of which are classified. In one example, the number of classified defect events is greater than one hundred classified defect events. Inspection scenarios determined from a large number of classified defect events typically perform well and do not require additional modification. However, there is a cost in time and effort associated with the classification of a relatively large number of defect events.

In some other examples, classification and attribute identification and inspection scenario determination are performed iteratively to arrive at inspection scenarios that perform well with less classification effort. In one example, an initial inspection scenario may be determined based on labeled defect data 153 from a relatively small number of classified defect events on a wafer. In one example, the number of classified defect events is less than ten. In some examples, the relatively small set of labeled defect data 153 results from a "hot" scan over a small area of the wafer. In some examples, the relatively small set of labeled defect data 153 results from the classification of a very limited number of defect events. The initial inspection scenario is then implemented in an inspection of the wafer and a number of defect events are captured. A larger number of these defect events are classified to generate a second set of labeled defect data 153. A new inspection scenario is determined based on the second set of labeled defect data 153. The iteration can continue until the desired performance level is achieved. In this manner, the defect events that drive the determination of the subsequent inspection scenario are discovered from a previously determined inspection scenario, rather than a "hot" scan.

In the example described with respect to FIG. 2, an inspection scenario was associated with one acquisition mode, one set of defect detection parameters, and one set of classification algorithm parameters. In some other examples, a multi-mode inspection scenario may be determined by inspection scenario optimization tool 170.

Figure 3:
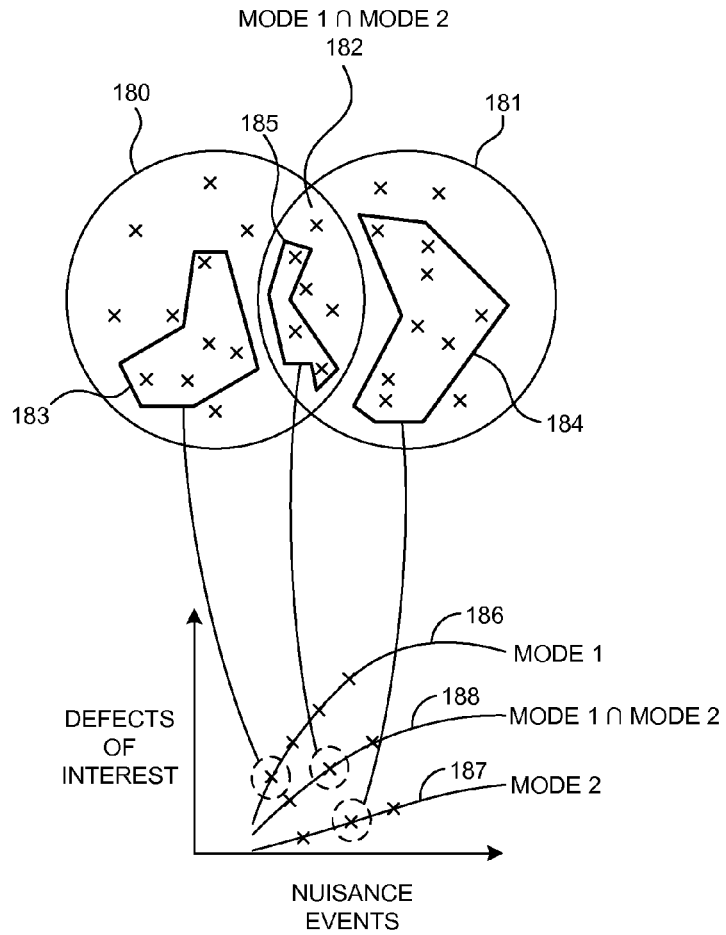
FIG. 3 is a simplified diagram illustrative of an inspection scenario including a combination of acquisition modes.

As illustrated in FIG. 3, labeled defect data 180 includes a number of labeled defect events associated with a first acquisition mode (i.e., Mode 1). Labeled defect data 181 includes a number of labeled defect events associated with a second acquisition mode (i.e., Mode 2). Some of the labeled defect events are captured by both acquisition mode 1 and acquisition mode 2. These commonly captured defect events are associated with both acquisition modes 1 and 2 and are treated as a separately identifiable combination mode (i.e., Mode 1∩Mode 2). As illustrated in FIG. 3, labeled defect events 182 are associated with Mode 1∩Mode 2. Inspection scenario optimization tool 170 determines inspection scenarios associated with labeled defect data 180 (e.g., inspection scenario 183), labeled defect data 181 (e.g., inspection scenario 184), and labeled defect data 182 (e.g., inspection scenario 185) as described hereinbefore. As illustrated in FIG. 3, ROC curves 186-188 may be generated based on inspection scenarios associated with Mode 1, Mode 2, and Mode 1∩Mode 2, respectively. In turn, these inspection scenarios (e.g., inspection scenarios 183-185) are treated in combination to arrive at an optimal combination of inspection scenarios.

Figure 4:
FIG. 4 is a diagram illustrative of a plurality of inspection scenarios including multi-mode scenarios.
Figure 5:
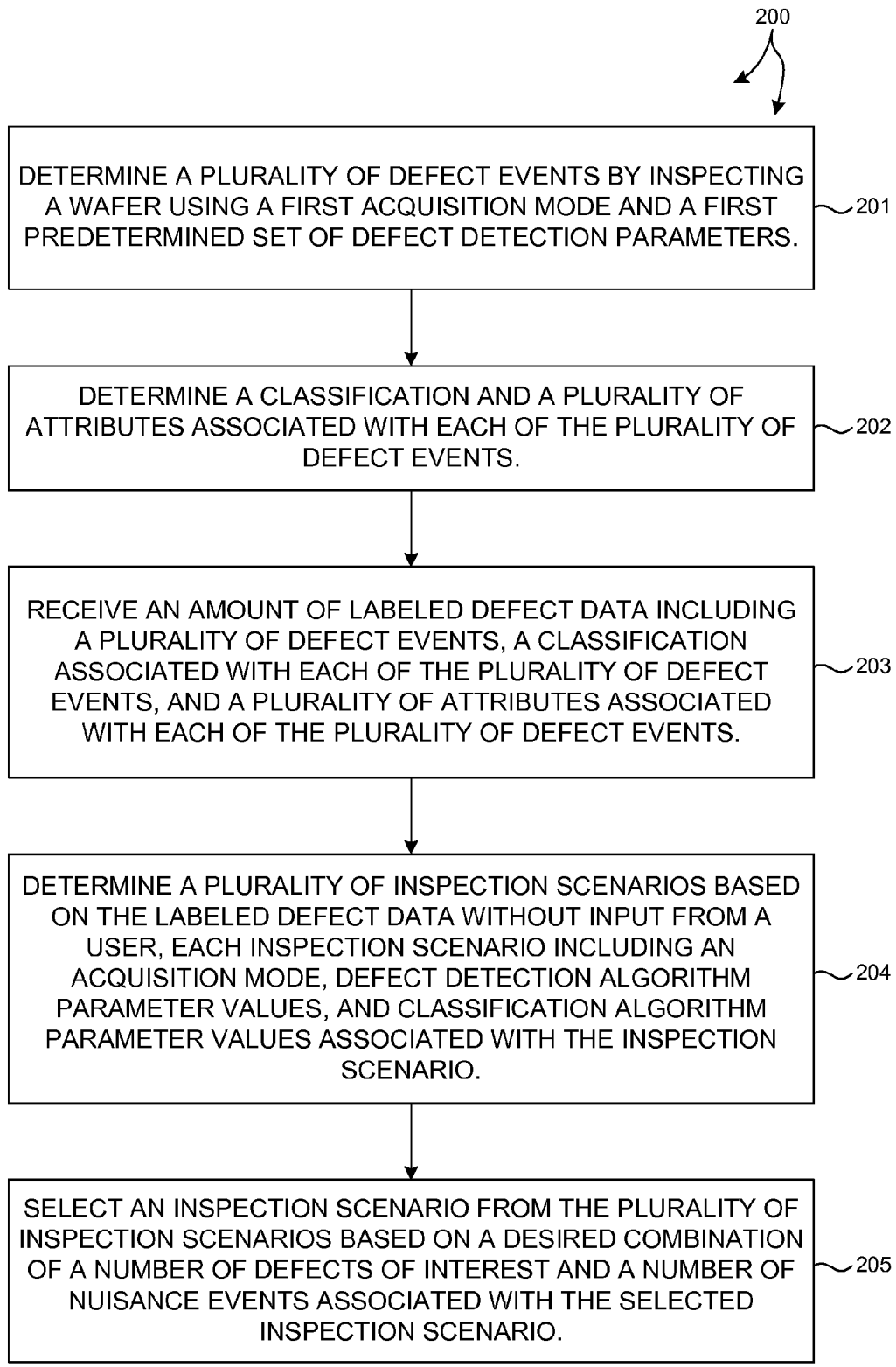
FIG. 5 is a flowchart 190 illustrative of a method 200 of determining an inspection scenario.

FIG. 4 illustrates three solution sets that each include inspection scenarios associated with Mode 1, Mode 1∩Mode 2, and Mode 2. As illustrated by way of example, solution set 1 includes a Mode 1 inspection scenario that includes five defects of interest and no nuisance events, a Mode 1∩Mode 2 inspection scenario that includes three defects of interest and no nuisance events, and a Mode 2 inspection scenario that includes eight defects of interest and no nuisance events. A combination of the Mode 1 inspection scenario, the Mode 1∩Mode 2 inspection scenario, and the Mode 2 inspection scenario of solution set 1 captures sixteen defects of interest and no nuisance events.

As illustrated in FIG. 4, a number of combinations of inspection scenarios include one nuisance event. An optimal combination of inspection scenarios that includes one nuisance event is determined. As illustrated by way of example, the Mode 1 inspection scenario of solution set 2, the Mode 1∩Mode 2 inspection scenario of solution set 1, and the Mode 2 inspection scenario of solution set 1 include twenty three defects of interest and one nuisance event. The Mode 1 inspection scenario of solution set 1, the Mode 1∩Mode 2 inspection scenario of solution set 2, and the Mode 2 inspection scenario of solution set 1 include nineteen defects of interest and one nuisance event. The Mode 1 inspection scenario of solution set 1, the Mode 1∩Mode 2 inspection scenario of solution set 1, and the Mode 2 inspection scenario of solution set 2 include twenty seven defects of interest and one nuisance event. The optimal combination of inspection scenarios that includes one nuisance event is the combination that includes the greatest number of defects of interest (i.e., the Mode 1 inspection scenario of solution set 1, the Mode 1∩Mode 2 inspection scenario of solution set 1, and the Mode 2 inspection scenario of solution set 2). Similarly, optimal combinations of inspection events can be determined for a particular number of nuisance events. Furthermore, these optimal combinations can be plotted on a ROC curve as described herein. A user can review the resulting ROC curve and select an optimal combination of inspection scenarios for further wafer inspection.

In the example illustrated in FIG. 3, an optimal combination of inspection scenarios includes two acquisition modes (Modes 1 and 2), defect detection algorithm parameters associated with Modes 1 and 2, and three sets of classification parameters. One set of classification parameters is associated with Mode 1, a second set of classification parameters is associated with Mode 2, and a third set of classification parameters is associated with combination Mode 1∩Mode 2. In this manner, labeled defect data 153 associated with multiple acquisition modes can be treated together to determine the optimal mode combination and classifiers that can separate defects of interest (DOI) and nuisance or noise events on a wafer. By distinguishing data sets from multiple acquisition modes into various natural segments and applying distinct classifiers separately to each natural segment a higher sensitivity to DOI is achieved.

As illustrated in FIGS. 3-4, data associated with two acquisition modes is treated as a combination of three mode segments with one classifier associated with each mode segment. However, this may be extended to three or more acquisition modes in an analogous manner. In general, data associated with M acquisition modes may be treated as a combination of up to N mode segments with one classifier associated with each mode segment where N is given by equation 1.

$$N = \sum_{K=0}^{M-1} \frac{M!}{(M-K)!K!} \quad (1)$$

For example, three acquisition modes may be treated as a combination of up to seven mode segments with one classifier associated with each segment. However, a smaller number of mode segments may be considered in a multi-mode inspection scenario. In one example, mode segments associated with distinct modes and pairs of distinct modes may be considered with one classifier associated with each mode segment. In this example, the number of mode segments N is given by equation 2.

$$N = M + \frac{(M)(M-1)}{2} \quad (2)$$

For example, three acquisition modes may be treated as a combination of six mode segments (i.e., three acquisition modes alone and three pairwise combinations of the three acquisition modes). In some embodiments, an optimal inspection scenario includes pairwise combinations of up to ten acquisition modes. In some embodiments, an optimal inspection scenario includes pairwise combinations of up to one hundred acquisition modes. In some other embodiments, an optimal inspection scenario includes pairwise combinations of one hundred acquisition modes or more.

FIG. 4 is illustrative of a method 200 of determining inspection scenarios combining acquisition mode, defect detection, and classification parameters from results of a scan of a wafer without user intervention. At block 201, a wafer surface is inspected in a first acquisition mode and a predetermined set of defect detection parameters. Inspection reveals a number of defect events. In block 202, a portion of the defect events are classified and a number of attributes are identified with these defect events. These defect events are labeled with this information. In block 203, the labeled defect data including the portion of the defect events, their classification, and their attributes are received, for example, by inspection scenario optimization tool 170. In block 204, a plurality of inspection scenarios are determined based on the labeled defect data without input from a user. Each inspection scenario includes an acquisition mode, defect detection algorithm parameter values, and classification algorithm parameter values. The inspection scenario may be implemented on a wafer inspection or metrology tool to inspect wafers. In block 205, an inspection scenario is selected from a plurality of inspection scenarios. The selection is based on a desired combination of the number of defects of interest captured by the inspection scenario versus the number of nuisance events captured by the inspection scenario.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM of other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

One or more layers may be formed upon a wafer. For example, such layers may include, but are not limited to, a resist, a dielectric material, a conductive material, and a semiconductive material. Many different types of such layers are known in the art, and the term wafer as used herein is intended to encompass a wafer on which all types of such layers may be formed.

One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

Although embodiments are described herein with respect to wafers, it is to be understood that the embodiments may be used for creating a defect sample for use in selecting one or more parameters of an inspection recipe for inspection of another specimen such as a reticle, which may also be commonly referred to as a mask or a photomask. Many different types of reticles are known in the art, and the terms "reticle," "mask," and "photomask" as used herein are intended to encompass all types of reticles known in the art.

The embodiments described herein generally relate to methods for efficient determination of inspection scenarios for recipe optimization purposes. For example, one embodiment relates to a computer-implemented method for determining an inspection scenario that includes an acquisition mode, defect detection parameter values, and classification parameter values. The methods described herein are not limited in the types of inspection systems for which one or more parameters of an inspection scenario can be selected as described herein. For example, in one embodiment, the inspection scenario includes an inspection scenario for bright field (BF) inspection of the wafer. In this manner, the inspection system may include a BF inspection system. The BF inspection system may be configured as described further herein. In another embodiment, the inspection scenario includes an inspection scenario for dark field (DF) inspection of the wafer. In this manner, the inspection system may include a DF inspection system. The DF inspection system may have any suitable configuration known in the art. The inspection system may also be configured for BF and DF inspection. In addition, the inspection system may be configured for inspection of patterned wafers and/or unpatterned wafers. The inspection scenario may include an inspection scenario for any of a LED inspection tool, edge inspection tool, backside inspection tool, macro-inspection tool, or multi-mode inspection tool (involving data from one or more platforms simultaneously), and any other metrology or inspection tool that benefits from automated inspection scenario generation.

In some examples, defect events are detected on a wafer by performing a hot inspection on the wafer. A "hot inspection" can be generally defined as an inspection in which a threshold applied to output of a detector of an inspection system is substantially close to the noise floor of the output. The defects may also be detected on more than one wafer by performing hot inspections on the wafers. For example, the defects may be detected on a lot of wafers (i.e., "a hot lot"). In addition, the user may run an inspection resulting in a hot lot.

The embodiments described herein, however, may or may not include performing the hot inspection of the wafer. For example, the embodiments described herein may include acquiring the results of a hot inspection performed on the wafer from an inspection system that performed the hot inspection or from a storage medium (e.g., a storage medium of the inspection system, a fab database, etc.) in which the inspection system stored the results of the hot inspection. In one such example, the features for all of the defects or a user-defined sub-population of the defects may be read by the embodiments described herein (e.g., uploaded from a storage medium or file that includes information about the defects detected by the hot inspection). In general, the results of the hot inspection may be acquired in any suitable manner (e.g., by scanning the wafer using an inspection system and applying a threshold to output generated by scanning).

Although certain specific embodiments are described above for instructional purposes, the teachings of this patent document have general applicability and are not limited to the specific embodiments described above. In one example, inspection tasks that require identifying defects of interest from nuisance events are described herein. However, the methods and systems as described herein apply to inspection tasks that involve defect binning as well. In one example, wafer inspection system 100 may include more than one light source (not shown). The light sources may be configured differently or the same. For example, the light sources may be configured to generate light having different characteristics that can be directed to a wafer at the same or different illumination areas at the same or different angles of incidence at the same or different times. The light sources may be configured according to any of the embodiments described herein. In addition one of the light sources may be configured according to any of the embodiments described herein, and another light source may be any other light source known in the art. In another example, wafer inspection system 100 may be a multi-spot system. In some embodiments, a multi-spot system may illuminate the wafer over more than one illumination area simultaneously. The multiple illumination areas may spatially overlap. The multiple illumination areas may be spatially distinct. In some embodiments, a multi-spot system may illuminate the wafer over more than one illumination area at different times. The different illumination areas may temporally overlap (i.e., simultaneously illuminated over some period of time). The different illumination areas may be temporally distinct. In general, the number of illumination areas may be arbitrary, and each illumination area may be of equal or different size, orientation, and angle of incidence. In yet another example, wafer inspection system 100 may be a scanning spot system with one or more illumination areas that scan independently from any motion of wafer 102. In some embodiments an illumination area is made to scan in a repeated pattern along a scan line. The scan line may or may not align with the scan motion of wafer 102. Although as presented herein, wafer positioning system 125 generates motion of wafer 102 by coordinated rotational and translational movements, in yet another example, wafer positioning system 100 may generate motion of wafer 102 by coordinating two translational movements. For example motion wafer positioning system 125 may generate motion along two orthogonal, linear axes (e.g., X-Y motion). In such embodiments, scan pitch may be defined as a distance between adjacent translational scans along either motion axis. In such embodiments, a wafer inspection system includes an illumination source and a wafer positioning system. The illumination source supplies an amount of radiation to a surface of a wafer over an illumination area. The wafer positioning system moves the wafer in a scanning motion characterized by a scan pitch (e.g., scanning back and forth in one direction and stepping by an amount equal to the scan pitch in the orthogonal direction). The wafer positioning system includes a motion controller that adjusts the scan pitch independently from the illumination area.

Accordingly, various modifications, adaptations, and combinations of various features of the described embodiments can be practiced without departing from the scope of the invention as set forth in the claims.

What is claimed is:

1. A method comprising:
   receiving an amount of labeled defect data including a plurality of defect events, a classification associated with each of the plurality of defect events, and a plurality of attributes associated with each of the plurality of defect events; and
   determining a plurality of inspection scenarios based on the labeled defect data without input from a user, each inspection scenario including an acquisition mode, defect detection algorithm parameter values, and classification algorithm parameter values associated with the inspection scenario, wherein the determining of the plurality of inspection scenarios involves determining a solution in a multi-dimensional space with each dimension defined by each of the plurality of attributes.

2. The method of claim 1, wherein the classification associated with each of the plurality of defect events include any of a real defect, a defect of interest, and a nuisance event.

3. The method of claim 1, wherein the plurality of attributes associated with each of the plurality of defect events include any of a MDAT grey level, a defect magnitude, a MDAT offset, and an energy level.

4. The method of claim 1, wherein the amount of labeled defect data is any of labeled optics selector data and labeled hot scan data.

5. The method of claim 1, further comprising:
selecting an inspection scenario from the plurality of inspection scenarios based on a desired combination of a number of defects of interest and a number of nuisance events associated with the selected inspection scenario.

6. The method of claim 5, wherein the selecting is performed without input from a user.

7. The method of claim 1, wherein the amount of labeled defect data is associated with at least two inspection scans each performed with a different acquisition mode.

8. The method of claim 7, wherein the determining of the plurality of inspection scenarios involves at least one inspection scenario that includes a combination of at least two acquisition modes of the at least two acquisition modes.

9. The method of claim 8, wherein the combination of the at least two acquisition modes of the at least two acquisition modes includes the greatest number of defects of interest for a particular number of nuisance events.

10. The method of claim 1, further comprising:
determining the plurality of defect events by inspecting a wafer using a first acquisition mode and a first predetermined set of defect detection parameters.

11. The method of claim 10, further comprising:
determining the classification associated with each of the plurality of defect events and the plurality of attributes associated with each of the plurality of defect events by Scanning Electron Microscope (SEM) review.

12. A non-transitory, computer-readable medium, comprising:
code for causing a computer to receive an amount of labeled defect data including a plurality of defect events, a classification associated with each of the plurality of defect events, and a plurality of attributes associated with each of the plurality of defect events; and
code for causing the computer to determine a plurality of inspection scenarios based on the labeled defect data without input from a user, each inspection scenario including an acquisition mode, defect detection algorithm parameter values, and classification algorithm parameter values associated with the inspection scenario, wherein the determining of the plurality of inspection scenarios involves determining a solution in a multi-dimensional space with each dimension defined by each of the plurality of attributes.

13. The non-transitory, computer-readable medium of claim 12, wherein the amount of labeled defect data is associated with at least two inspection scans each performed with a different acquisition mode.

14. The non-transitory, computer-readable medium of claim 13, wherein the determining of the plurality of inspection scenarios involves at least one inspection scenario that includes a combination of at least two acquisition modes of the at least two acquisition modes.

15. An apparatus comprising:
a plurality of storage elements configured to store an amount of labeled defect data including a plurality of defect events, a classification associated with each of the plurality of defect events, and a plurality of attributes associated with each of the plurality of defect events; and
an inspection scenario optimization tool configured to:
receive the amount of labeled defect data; and
determine a plurality of inspection scenarios based on the labeled defect data without input from a user, each inspection scenario including an acquisition mode, defect detection algorithm parameter values, and classification algorithm parameter values associated with the inspection scenario, wherein the determining of the plurality of inspection scenarios involves determining a solution in a multi-dimensional space with each dimension defined by each of the plurality of attributes.

16. The apparatus of claim 15, wherein the amount of labeled defect data is associated with at least two inspection scans each performed with a different acquisition mode.

17. The apparatus of claim 16, wherein the determining of the plurality of inspection scenarios involves at least one inspection scenario that includes a combination of at least two acquisition modes of the at least two acquisition modes.

* * * * *